United States Patent [19]

Moulin

[11] Patent Number: 4,707,068
[45] Date of Patent: Nov. 17, 1987

[54] OPTICAL FIBER WAVEGUIDE CONNECTOR SYSTEM

[75] Inventor: Norbert L. Moulin, Placentia, Calif.

[73] Assignee: Hughes Aircraft Company, Los Angeles, Calif.

[21] Appl. No.: 719,627

[22] Filed: Apr. 3, 1985

Related U.S. Application Data

[63] Continuation of Ser. No. 65,032, Aug. 9, 1979, which is a continuation-in-part of Ser. No. 805,500, Jun. 10, 1977, abandoned.

[51] Int. Cl.$^4$ ............................................. G02B 7/26
[52] U.S. Cl. .............................. 350/96.21; 350/96.22
[58] Field of Search ............... 350/96.20, 96.21, 96.22; 339/16 R

[56] References Cited

U.S. PATENT DOCUMENTS

| | | | |
|---|---|---|---|
| 3,305,689 | 2/1967 | Leavy et al. | 350/96.27 |
| 3,624,585 | 11/1971 | Kobalas et al. | 339/1 GR |
| 3,846,010 | 11/1974 | Love et al. | 350/96.22 |
| 3,914,015 | 10/1975 | McCartney | 350/96.22 |
| 3,936,145 | 2/1976 | McCartney | 350/96.22 |
| 3,963,323 | 6/1976 | Arnold | 350/96.22 |
| 4,076,379 | 2/1978 | Chouinard | 350/96.22 |
| 4,081,208 | 3/1978 | Meade | 350/96.20 |
| 4,084,882 | 4/1978 | Hogan et al. | 350/96.20 |
| 4,114,979 | 9/1978 | Heldt | 350/96.21 |
| 4,140,366 | 2/1979 | Makuch et al. | 350/96.21 |
| 4,193,665 | 3/1980 | Arnold | 350/96.21 |

Primary Examiner—William L. Sikes
Assistant Examiner—Frank González
Attorney, Agent, or Firm—Lewis B. Sternfels; R. L. Taylor; A. W. Karambelas

[57] ABSTRACT

Precise alignment, required for a low-loss electromagnetic interconnection between single and multiple stranded optical fiber conductors or waveguides, is achieved in a conventional electrical connector block. A pair of guide bushings having precise outer dimensions are secured respectively to the termini of the optical fiber conductors and these bushings, in their respective connector blocks, are adapted for insertion into a split tube having a precisely dimensioned inner diameter. The optical fiber conductors, being concentric with the bushings, thereby are precisely interconnected. For single fibers, the bushings and the split tube are cylindrical. For multiple stranded fibers or fiber bundles, the bushings and the split tube have identical polygonal cross-sections, which match precisely identical polygonally shaped fiber-receiving openings in the bushings. Physical contact between the electromagnetically coupled fiber optic conductors is prevented by a flat annular shim which is loosely secured to the split tube and contacted by the bushings.

11 Claims, 8 Drawing Figures

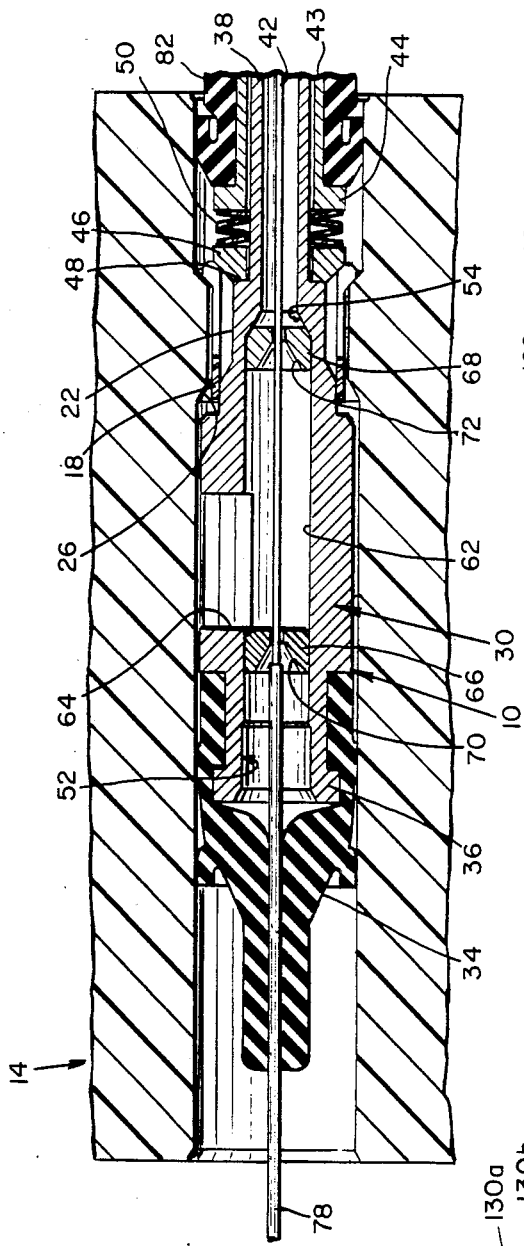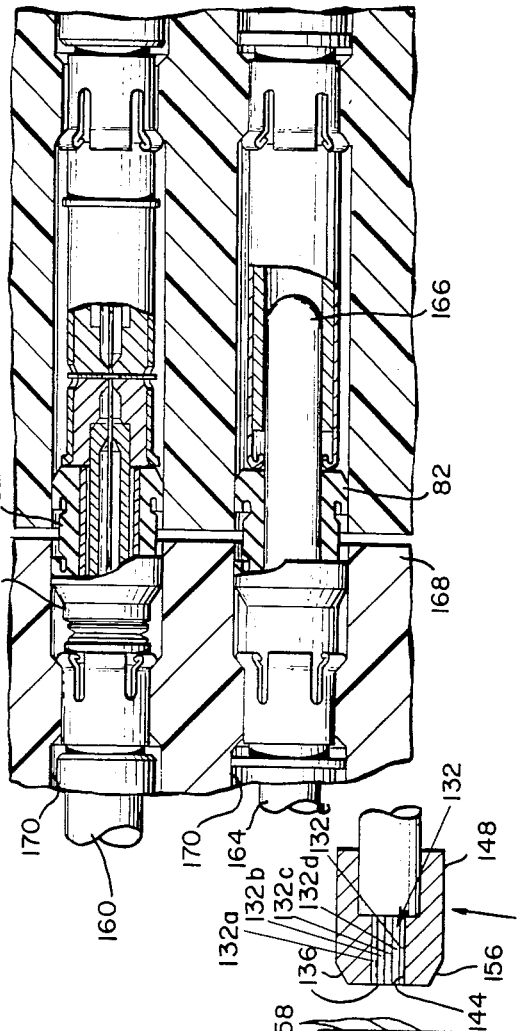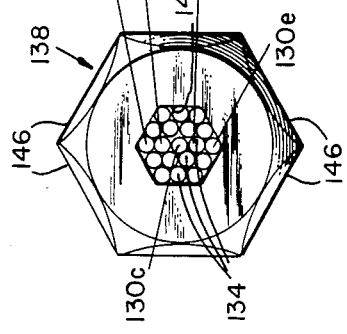
Fig. 1a.
Fig. 5.
Fig. 6.
Fig. 7.

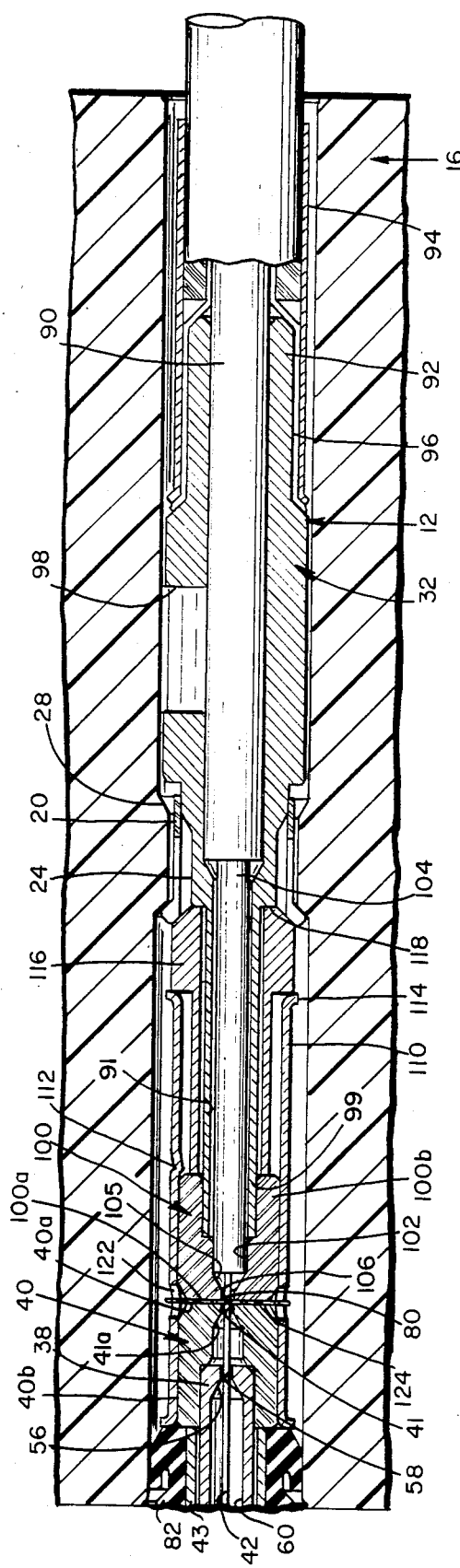
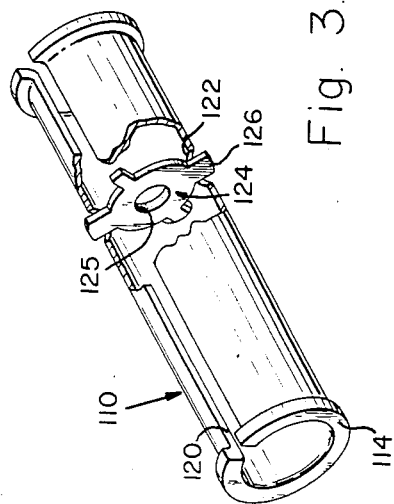
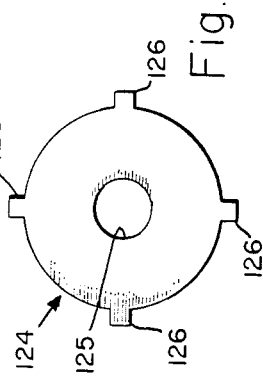
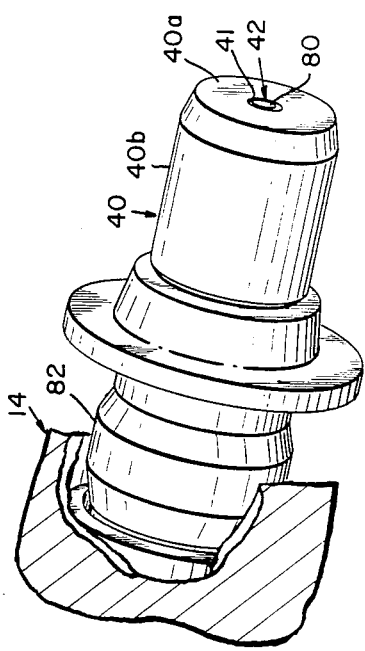
Fig. 1b.
Fig. 3.
Fig. 4.
Fig. 2.

OPTICAL FIBER WAVEGUIDE CONNECTOR SYSTEM

This is a continuation of application Ser. No. 65,032 filed 9 Aug. 1979, in turn a continuation of Ser. No. 805,500 filed 10 June 1977, now abandoned.

BACKGROUND OF THE INVENTION

1. Field of the Invention

The present invention relates to means for electromagnetically coupling single and multiple strand optical fiber conductors or waveguides.

2. Description of the Prior Art and Background Considerations

A fundamental problem in the interconnection of optical fiber conductors is the alignment of the fibers of the two conductors. A further problem is the ability to maintain such alignment under repeated engagement and disengagement cycles. It is desirable that this precise coupling be accomplished without the use of index matching materials, since they are prone to contamination and could degrade coupling efficiency after several engagment and separation cycles. Typically, such conductors have a diameter of approximately 0.005 inches (0.127 mm). Because even minute misalignment between mating optical fiber conductors results in significant transmission loss, it is imperative that they be precisely aligned. With very small diameter conductors, it is apparent that the alignment task for single strand fibers is formidable. Alignment between multiple strand fibers is even more difficult.

Presently known optical fiber interconnects are known, and their losses have been advertised to be 0.5 db to 3.5 db. Such a variation in loss means that it is not possible to obtain effectively repeatable alignment.

It is further desirable to prevent the ends of the optical fiber conductors to contact and, therefore, to be scratched. Such scratching or other damage causes the light being transmitted to be diffused with consequential loss in light transmission.

In addition to these and other considerations, it is also desirable that the connector bodies receiving the optical fiber conductors be capable of receiving, at the same time, conventional electrical conductors and contacts so that mixes of the two electromagnetic signal carrying means can be realized. As a corollary, specialization in parts and stock and manufacturing equipment can be avoided if the same connector blocks and other termination hardware are used for coupling of both electrical as well as optical conductors.

SUMMARY OF THE INVENTION

The present invention overcomes or avoids these and other problems and meets the considerations above outlined by providing for a split sleeve which accepts alignment bushings attached to each end of the optical fiber connectors. The optical fibers are received in holes in the bushings and the holes are precisely concentric with the bushing peripheries. Therefore, the bushings as well as the sleeve must be precisely dimensioned, whether in circular or polygonal cross-section (corresponding identically in shape to that of the holes in the bushings), to provide for the greatest possible concentricity and actual alignment between the optical fibers to be coupled. To mate and align the bushings, they are slid into the split sleeve which acts as a spring. Thus, alignment of the bushings automatically and precisely aligns the optical fibers and permits coupling and uncoupling cycles. To prevent contact of the conductors at the interface between the bushings, a shim or similar spacing means is positioned in the sleeve and comes into contact with only the bushings. The optical fiber conductors are received in contacts which are configured to permit their insertion into conventional electrical connector bodies. Thus, mixes of optical and electrical conductors and couplings are obtainable in the same conductor block.

It is, therefore, an object of the present invention to provide for an electromagnetic coupling between optical fiber conductors.

Another object is to provide for a simple yet precise alignment between such optical fiber conductors.

Another object is to provide for repeated coupling and uncoupling of the conductors without degradation of the alignment.

Another object is to provide for such alignment which does not depend on the use of index matching materials.

Another object is to prevent physical contact between the coupled optical fiber conductors.

Another object is to provide for use of connector bodies for mixed or alternative reception of different electro-magnetic signal carrying conductors and/or contacts, such as optical and electrical signals.

Other aims and objects as well as a more complete understanding of the present invention will appear from the following explanation of exemplary embodiments and the accompanying drawings thereof.

BRIEF DESCRIPTION OF THE DRAWINGS

FIGS. 1a and 1b are views in cross-section, of a pair of connector bodies with single strand optical fiber conductors and contact bodies therein coupled together, with one strand having a larger diameter than the other;

FIG. 2 is a perspective view of one of the contact bodies of FIG. 1 with its optical fiber conductor terminated therein;

FIG. 3 is a perspective view of the split tube or sleeve shown in FIG. 1 used to obtain precise alignment between the coupled optical fiber conductors;

FIG. 4 is a view of the shim used to prevent contact between the coupled optical fiber conductors of FIG. 1;

FIG. 5 is an end view of a second embodiment of the present invention illustrating a hexagonally shaped bushing used to terminate a conductor having multiple strands of optical fibers;

FIG. 6 depicts a pair of bushings, as shown in FIG. 5, coupling multiple stranded optical fiber conductors together with a hexagonally shaped split sleeve properly aligning the fiber termini; and FIG. 7 depicts the combination where both electrical wires and optical fibers are positioned in a common connector body.

DESCRIPTION OF THE PREFERRED EMBODIMENTS

While the preferred embodiments relate to connecting optical fiber conductors in much the same manner that electrical wires are connected in conventional electrical connectors, specific uses may require quite different approaches. Therefore, it is to be understood that other configurations lying within the scope of the present invention are also intended to be included.

Accordingly, with reference to FIGS. 1–4, a pair of contacts 10 and 12 are positioned within their respective connector bodies 14 and 16 in any conventional manner, such as by retaining clips 18 and 20. These retaining clips reside within recesses 22 and 24 of their respective contacts and are adapted to engage annular portions 26 and 28 of their connector bodies.

Each contact 10 and 12 includes a contact body 30 and 32 with a pressure-sensitive wire seal, such as seal 34, attached at the rearward end 36 of contact body 30. Such a pressure-sensitive wire seal 34 is described in U.S. Pat. No. 3,792,416, which also utilizes similar retaining clips 18. At its opposite or forward end 38, contact body 30 carries an alignment bushing 40, which is secured to end 38 in any convenient manner. Bushing 40 is provided with a precisely formed hole 41 with a fiber-guiding bevelled opening 41a at its entry for receiving the terminus of an optical fiber 42. The diameter of hole 41 is as close as possible as that of fiber 42.

Abutting against alignment bushing 40 is a spring spacer 43, which is provided with an upstanding spring abutment end 44. Spaced from upstanding abutment end 44 is a second spacer ring 46 which abuts against a surface 48 of contact body 30. Positioned between spacers 43 and 46 are a plurality of spring washers 50, such as four Belleville spring washers. The purpose of these spring washers will become evident hereinafter.

Contact body 30 is further provided with a through bore 52 extending from its rearward end 36 to its forward end 38. In its preferred configuration, bore 52 is provided with several diameters which decrease in dimension from its rearward end 36 through a pair of bevelled openings 54 and 56, and terminating in a through hole 58 at its forward end 38. Thus, bore 52 may be said to comprise a small hole 58, a nose bore portion 60, and a securing bore portion 62. An opening 64 transversely extends through a wall of contact body 30 from securing bore portion 62. Secured also within bore portion 62 are a pair of alignment guides 66 and 68, which are respectively provided with bevelled entrances 70 and 72.

For assembly of an optical fiber conductor within contact body 30, an optical fiber conductor or waveguide 78 is first prepared. Generally, such a conductor 78 includes a buffer material and a Kinar material both of which are removed for applicable lengths so as to expose the bare optical fiber 42 itself. Removal of the buffer material may be made by use of a heated cutting edge and the Kinar material may be removed by a chemical such as acetone. Thereafter, stripped fiber 42 is cut by use of any suitable fiber cutting tool, such as described in The Bell System Technical Journal, Volume 52, No. 9, November, 1973, pages 1579–1588 in an article entitled, "Optical Fiber End Preparation for Low-Loss Splices."

After the fiber is properly cut, it is installed into contact body 30 by first passing it through pressure-sensitive seal 34, guides 66 and 68, hole 58, and precision hole 41 of bushing 40. By placing the end surface 40a of bushing 40 against the suitable stop of a fixture, terminus 80 of optical fiber 42 is made exactly flush with surface 40a. A bonding material is thereafter placed through opening 64 and into securing bore portion 62 lying between alignment guides 66 and 68. Such a bonding material may be of any suitable material such as epoxy or other adhesive or, if desired, a metallic slug such as of lead which is crimped uniformly against optical fiber 42. Contact 10 is then inserted with connector body 14 to establish a latching engagement between retaining clip 18 and annular portion 26.

An interface seal 82 is then placed over bushing 40 so that it is retained between bushing 40 and upstanding abutment end 44 of spacer 42. Such an interface seal 82 is also described in above-identified U.S. Pat. No. 3,792,416.

Contact 12 may also be made in a similar fashion as contact 10; however, it is shown differently herein in order to show a means by which an optical fiber conductor 90 of different (and larger) diameter may be coupled to optical fiber 42. In this embodiment, after optical fiber conductor 90 has been inserted within a through bore 91 of contact body 32, optical fiber conductor 90 is secured thereto at the contact body's rearward end 92 by a tube 94 crimped against strength inducing threads 96 which are conventionally formed in optical fiber conductors. A laterally placed opening 98, similar to opening 64 in contact body 30, permits insertion of a bonding means for holding optical fiber conductor 90 precisely in place.

Contact 12 is provided at its forward end 99 with a bushing 100 which is similar to bushing 40 with the exception that bushing 100 has an internal opening 102 which is machined or otherwise formed to receive a forward portion 104 of optical fiber conductor 90. Also similar to bushing 40, bushing 100 is provided with a fiber guiding bevelled opening 105 terminating in a precision formed hole 106 whose diameter is precisely equal to that of the optical fiber. The fiber terminus is made flush with end surface 100a of the bushing.

An alignment sleeve or tube 110 which is utilized to align bushings 40 and 100, is positioned on contact 12 in any convenient manner, such as by an indent 112 and an end 114 of sleeve 110 respectively abutting bushing 100 and a spacer ring 116. Spacer ring 116, in turn, contacts a shoulder 118 of contact body 32 as well as retainer ring 20. If desired, spacer ring 116 and contact body 32 may be made of a single machined part.

As best shown in FIG. 3, alignment sleeve 110 is provided with a slot 120 along its length and has a suitable number of openings 122 therein. These openings 122 are adapted to loosely retain a shim 124, shown in FIG. 4, which is provided with an aperture 125, and with tabs 126 that are adapted to reside within holes 122. Alignment sleeve 110 is made of a spring material and has an internal diameter which is slightly less, in its relaxed condition, than that of the outer peripheries 40b and 100b of bushings 40 and 100. Because the outer peripheries of bushings 40 and 100 are precision dimensioned so that bushing peripheries 40b and 100b are as exactly concentric as possible with their holes 41 and 106, when the bushings are slid within alignment sleeve 110, holes 41 and 106 are precisely aligned which, in turn, precisely align the fiber termini.

In order to prevent contact and deleterious markings or other abrasion of the optical fiber termini, shim 124 contacts the end faces 40a and 100a respectively of bushings 40 and 100. Aperture 125 permits optical transmission between the fibers.

When bushings 40 and 100 are brought together on meeting of the connector bodies 14 and 16, there is a slight additional dimension of approximately 0.015 inches of travel remaining before the coupling hardware bottoms out. At this position, Belleville spring washers 50 begin to deflect and maintain a compression load between bushings 40 and 100 and, therefore, to maintain bushings 40 and 100 constantly against shim 124 so as not to vary the coupling distance between the termini of the optical fibers.

From the above description, it becomes evident that the present invention avoids the need to use an index matching material. However, if such is desired, one may support it by shim 124 in aperture 125 thereof. If the material becomes contaminated, the entire assembly of tube 110 and shim 124 may be replaced with another similar assembly with clean index matching material.

For coupling a pair of multiply-stranded optical fiber conductors 130 and 132 together, reference is directed to FIGS. 5 and 6. While the coupling hardware in this embodiment is the same as that described with respect to the single strand optical fiber conductor of FIGS. 1-4, it is further required that each fiber terminus of one conductor is precisely aligned with a corresponding fiber terminus of the other conductor, in order to minimize or avoid transmission losses.

It has been suggested that one standard for enclosing multiply-stranded optical fiber conductors comprises an enclosure having an internal bore shaped in the form of a hexagon, in that a hexagon is a simple geometric shape and consumes less unoccupied space than a circle. It has further been suggested that a standard number of fibers comprise nineteen as best fitting within a hexagonal enclosure. The use of multiple strands ensures continued transmission in the event one or more strands break. Accordingly, FIGS. 5 and 6 follow these suggested standards, although it is to be understood that the present invention is as adaptable to other numbers of fiber strands and to other housing internal bores having any polygonal or curved shape.

In the embodiments depicted in FIGS. 5 and 6, conductors 130 and 132 respectively terminate in bundles of nineteen fibers whose termini 134 and 136 are shown and in which one or more of the conventional protective coatings and coverings may have been removed. Termini 134 and 136 are precisely retained respectively within bushings 138 and 140. Bushings 138 and 140 are similar to bushings 40 and 100 of FIGS. 1-4, except that their through holes 142 and 144 have a non-circular shape, shown here in the standard hexagonal shape. Hexagonal holes 142 and 144 are precisely formed so that fiber termini 134 and 136 fit tightly therein, in order to prevent any detectable movement of the termini. Bushings 138 and 140 further differ from the earlier described bushings by having their peripheries 146 and 148 also shaped in the precise non-circular shape of holes 142 and 144. For the hexagonal shapes shown, each of the respective hexagonal sides of periphery 146 and hole 142 and the sides of periphery 148 and hole 144 are parallel and equidistantly spaced so that there is exact concentricity between the peripheries and the holes of the respective bushings and, therefore, between each of the fiber termini 134 and 136. Thus, for example, a center row of five individual fibers 130a, 130b, 130c, 130d and 130e are precisely aligned with a corresponding center row of five individual fibers 132a, 132b, 132c, 132d and 132e.

For coupling the fibers together in precise alignment, a sleeve 150 of spring material is provided with the precise non-circular shape of holes 142 and 144 and peripheries 146 and 148. Like sleeve 110 of FIGS. 1-4, the internal periphery 152 of sleeve 150 is slightly smaller than bushing peripheries 146 and 148 and sleeve 150 is also provided with a longitudinally extending slot 154 so that bushings 146 and 148 can be slid into internal periphery 152. Because of the non-circular peripheral shapes involved, to avoid binding between the bushings and the sleeve in the event they are misaligned, both initially contacting surfaces of the bushings and the sleeve are rounded at 156 and 158 for a small angle such as 7° to 8° so that a slight total angular rotational movement of about 15° is encouraged between the bushings and the sleeve during mating engagements.

To minimize excessive forces that may be needed to rotate a plurality of contacts if the mating bushings and sleeve are not initially aligned, despite the presence of rounded portions 156 and 158, it is desired that there be relatively precise alignment of the bushings and their attached contacts within their connector body. Such alignment can be obtained by forming non-circular holes in the connector body or by using a detent on a contact which can reach into a neighboring contact bore of the connector body to approximately angularly locate the contacts and bushings in their bores.

Also, as in FIGS. 1-4, a shim of circular or corresponding non-circular shape is placed within sleeve 150 to prevent physical contact between the coupled fibers of conductors 130 and 132.

While the two preceeding embodiments respectively of FIGS. 1-4 and FIGS. 5-6 describe coupling of optical fiber conductors, it is preferred that the connector bodies be of a standard configuration which is adaptable to coupling optical as well as electrical or other electromagnetic signals. Such a standard configuration not only permits use of the same conductor body for all forms of electromagnetic signal-carrying conductor couplings but also enables one to mix such conductors and their contacts in the same connector body. Such a configuration is illustrated in FIG. 7 in which an optical fiber conductor 160 and its contact 162 and an electrical conductor 164 and its contact 166 are placed in a common connector body 168, in their respective bores 170. Optical fiber conductor 160 and its contact 162 may comprise any of the embodiments previously described, while electrical conductor 164 and its contact 166 may comprise those described in afore-mentioned U.S. Pat. No. 3,792,416. It is to be understood, however, that this concept encompasses any form of contact and conductor coupling, whether by the precise optical fiber and electrical conductors and contacts herein described or referred to or by any other conductors and contacts amenable to alternate or mixed reception in a connector body.

Although the invention has been described with reference to particular embodiments thereof, it should be realized that various changes and modifications can be made therein without departing from the spirit and scope of the invention.

What is claimed is:

1. A connector for electromagnetically coupling optical fiber conductors together at their termini comprising:

alignment means securely coupled to each of said optical fiber conductors at their termini, with said termini of said optical fiber conductors extending flush with terminal faces of said alignment means, each of said alignment means having a precisely dimensioned periphery for mechanically enlarging each of said termini of said optical fiber conductors;

a longitudinally split sleeve of resilient material having openings therein and a precisely dimensioned interior which is precisely mated to said precisely dimensioned peripheries of said termini alignment means, with the dimension of the sleeve interior being slightly smaller than the peripheral dimensions of said termini alignment means; and a shim having an opening therein contactable with said terminal faces, in which said opening is aligned with said optical fiber conductors, said shim further having tabs extending therefrom into the sleeve openings and loosely secured to and within said tubular sleeve and adjustably contactable with said alignment means, and spacing said termini of said optical fiber conductors from mutual physical contact.

2. A connector as in claim 1 wherein said alignment means comprise cylindrical bushings and wherein said sleeve is cylindrically shaped and has a longitudinal slot defining the split for permitting said sleeve to act as a spring, the internal dimension of said sleeve when unbiased being slightly smaller than the peripheral dimensions of said bushings.

3. A connector for electromagnetically coupling optical fiber conductors together at their termini comprising:

alignment means securely coupled to each of said optical fiber conductors at their termini, each of said alignment means having a precisely dimensioned periphery for mechanically enlarging each of said termini of said optical fiber conductors;

a longitudinally split sleeve of resilient material having a precisely dimensioned interior which is precisely mated to said precisely dimensioned peripheries of said termini alignment means, with the dimension of the sleeve interior being slightly smaller than the peripheral dimensions of said termini alignment means; and a shim having tabs extending into openings in said sleeve and thereby loosely secured to and within said tubular sleeve and adjustably contactable with said alignment means for spacing said termini of said optical fiber conductors from mutual physical contact.

4. A connector for electromagnetically coupling optical fiber conductors together comprising:

means defining termini at the ends of said optical fiber conductors;

a sleeve of resilient material which is mated to said termini means; and a shim in said sleeve and having tabs loosely extending into openings in said sleeve and adjustably contactable with said termini means for spacing said termini from mutual physical contact.

5. A connector for electromagnetically coupling optical fiber conductors together at their termini comprising:

alignment means securely coupled to each of said optical fiber conductors at their termini, each of said alignment means having a precisely dimensioned periphery for mechanically enlarging each of said termini of said optical fiber conductors;

a longitudinally split sleeve of resilient material having a precisely dimensioned interior which is precisely mated to said precisely dimensioned peripheries of said termini alignment means, with the dimension of the sleeve interior being slightly smaller than the peripheral dimensions of said termini alignment means to enable radial expansion of said sleeve upon opening of the longitudinal split upon insertion of said alignment means therein for alignment of said termini;

means within said sleeve and adjustably contactable with said alignment means for spacing said termini of said optical fiber conductors from mutual physical contact; and means associated with both said sleeve and said termini spacing means and loosely securing said termini spacing means to and within said sleeve.

6. A connector according to claim 5 in which said securing means includes opening means in said sleeve and means on said termini spacing means extending loosely within and retained by said opening means.

7. A connector for electromagnetically coupling optical fiber conductors together at their termini comprising:

alignment means securely coupled to each of said optical fiber conductors at their termini, each of said alignment means having a precisely dimensioned periphery for mechanically enlarging each of said termini of said optical fiber conductors;

a longitudinally split sleeve of resilient material having a precisely dimensioned interior which is precisely mated to said precisely dimensioned peripheries of said termini alignment means, with the dimension of the sleeve interior being slightly smaller than the peripheral dimensions of said termini alignment means to enable radial expansion of said sleeve upon opening of the longitudinal split upon insertion of said alignment means therein for alignment of said termini;

means loosely secured to and within said sleeve and adjustably contactable with said alignment means for spacing said termini of said optical fiber conductors from mutual physical contact; and resilient means coupled to at least one of said alignment means for ensuring contact thereof with said termini spacing means.

8. A connector according to claim 7 in which said resilient means comprises belleville washers.

9. A method for electromagnetically coupling optical waveguides together at their termini comprising the steps of providing openings in a common alignment sleeve for the waveguides and tabs on a shim, extending the shim tabs into the sleeve openings for loosely supporting the shim in the sleeve, and aligning the waveguides respectively to the common alignment device, said shim automatically adjusting itself to the waveguides and spacing the waveguides from mutual physical contact.

10. A method as in claim 9 further comprising the steps of forming the alignment means as cylindrical bushings and the sleeve with a cylindrical shape with a longitudinal slot therein for permitting the sleeve to act as a spring, the internal dimension of the sleeve when unbiased being slightly smaller than the peripheral dimensions of the bushings.

11. A method for electromagnetically coupling optical waveguides together at their termini comprising the steps of providing a common alignment device having opening means therein, securing a shim loosely to the common alignment device and within the opening means, and aligning the waveguides respectively to the common alignment device, said shim automatically adjusting itself to the waveguides and spacing the waveguides from mutual physical contact.

* * * * *